Oct. 17, 1950  E. R. GILLILAND  2,526,473
METHOD OF MELTING AND PURIFYING IMPURE METAL POWDER
Original Filed June 2, 1947  3 Sheets-Sheet 1

FIG.-II

Edwin R. Gilliland Inventor
By J. Cashman Attorney

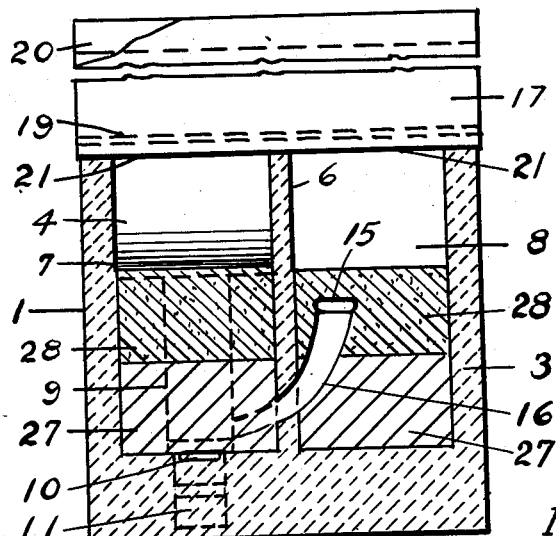
FIG.-IV
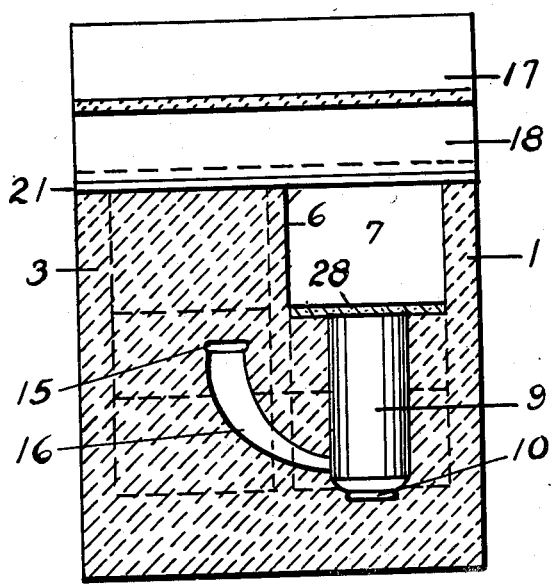
FIG.-III

Oct. 17, 1950     E. R. GILLILAND     2,526,473
METHOD OF MELTING AND PURIFYING IMPURE METAL POWDER
Original Filed June 2, 1947     3 Sheets-Sheet 3
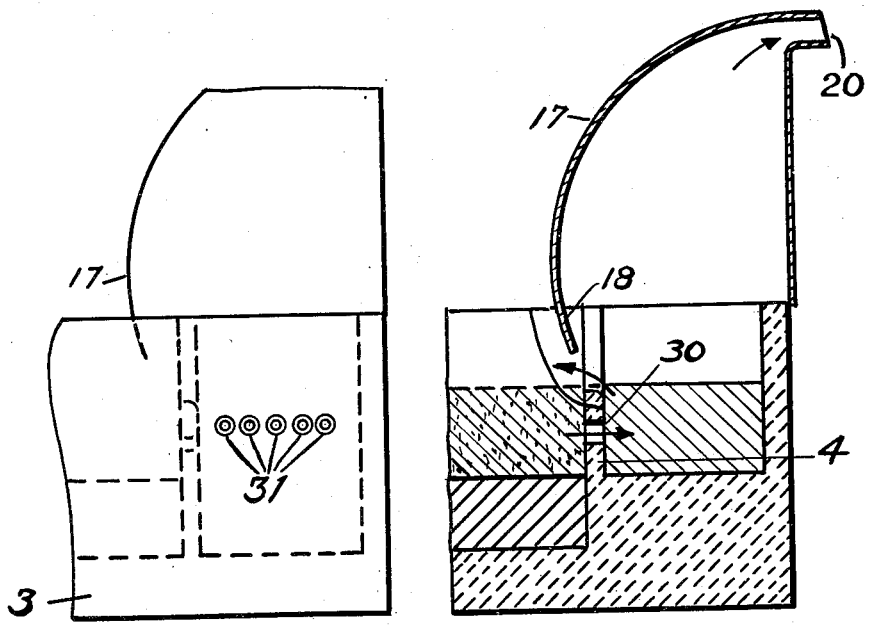
FIG.-VII     FIG.-VI
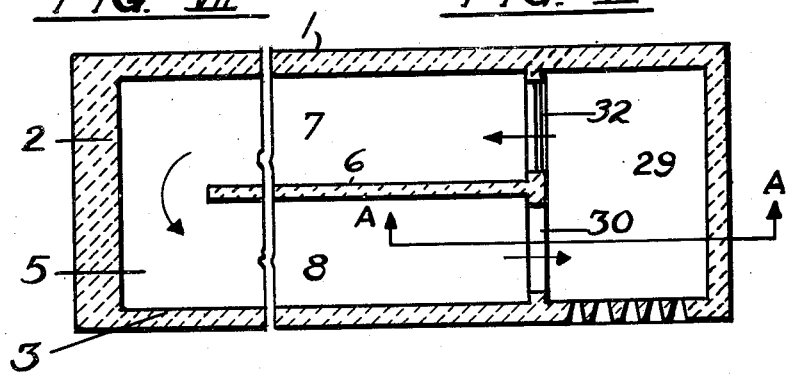
FIG.-V
Edwin R. Gilliland Inventor
By J. Cashman Attorney Patented Oct. 17, 1950

2,526,473

UNITED STATES PATENT OFFICE 2,526,473

METHOD OF MELTING AND PURIFYING IMPURE METAL POWDER

Edwin R. Gilliland, Arlington, Mass., assignor to Standard Oil Development Company, a corporation of Delaware Original application June 2, 1947, Serial No. 751,760. Divided and this application April 1, 1948, Serial No. 18,320

4 Claims. (Cl. 75—43)

1

This application is a division of my copending application Serial No. 751,760, filed June 2, 1947.

This invention is directed to an improved method and apparatus for purifying metals by smelting, and particularly for purifying powdered metal mixed with impurities. The metals, to the purification of which the present invention is directed, are those which are readily oxidizable at elevated temperature, such as, iron.

The ordinary open hearth furnace is operated with a relatively strong oxidizing atmosphere. The metal is protected from oxidation mainly by the slag. If a metal powder, such as, iron, is introduced, it tends to float on top of the slag and burn up. If one tries to hold a reducing atmosphere sufficient to be at equilibrium with molten iron saturated with carbon so as not to burn the carbon out of it, the furnace gases must be practically free of $CO_2$ and $H_2O$. There is no readily available fuel gas, the practical combustion of which can produce such a furnace gas with efficient heat generation.

If one is satisfied with a reducing gas sufficient to prevent oxidation of iron, which will burn the dissolved carbon out of the iron, one can tolerate more $CO_2$ and $H_2O$. However, this runs up the melting point of the iron so that furnace temperatures must rise several hundred degrees to keep the metal molten. This rise in temperature reduces the allowable $CO_2$ content of the gas but not to the point where use of a highly reducing fuel gas is impossible. In any event, the maintenance of the reducing conditions in the atmosphere of the open hearth involves seriously incomplete combustion with correspondingly low efficiency of fuel utilization.

The principal object of the present invention is the provision of an operating technique which makes possible the melting of powdered impure iron while at the same time permitting maximum utilization of fuel.

An additional object of the present invention is the provision of a process in which the carbon content of the purified metal can be controlled independently of the combustion required to supply the necessary heat.

A more specific object of the present invention is the provision of a method in which the heat required for smelting is supplied by circulating slag through a heating zone and returning it to the furnace proper to carry in the heat required for the operation.

Further advantages and objects of the present invention will appear from the following detailed description of the accompanying drawing; in which, Fig. 1 is a longitudinal horizontal section of a furnace according to the present invention along the line B—B of Fig. 2;

Fig. 2 is a longitudinal vertical section of the same furnace along the line A—A of Fig. 1;

Fig. 3 is a vertical transverse section of the same furnace along the line C—C of Fig. 1;

Fig. 4 is a vertical transverse section of the same furnace along the line D—D of Fig. 2;

Fig. 5 is a longitudinal horizontal section of a modified form of the furnace shown in Fig. 1;

Fig. 6 is a longitudinal vertical section along the line A—A of Fig. 5 with a portion broken away; and Fig. 7 is an exterior view of the portion of the furnace shown in Fig. 6.

Figure 1:
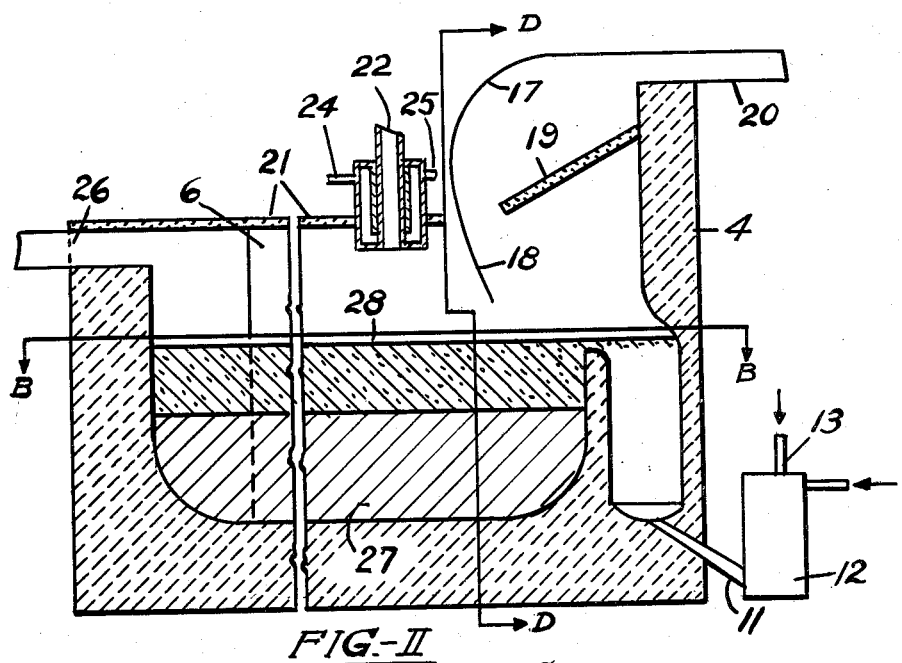
Figure 1:
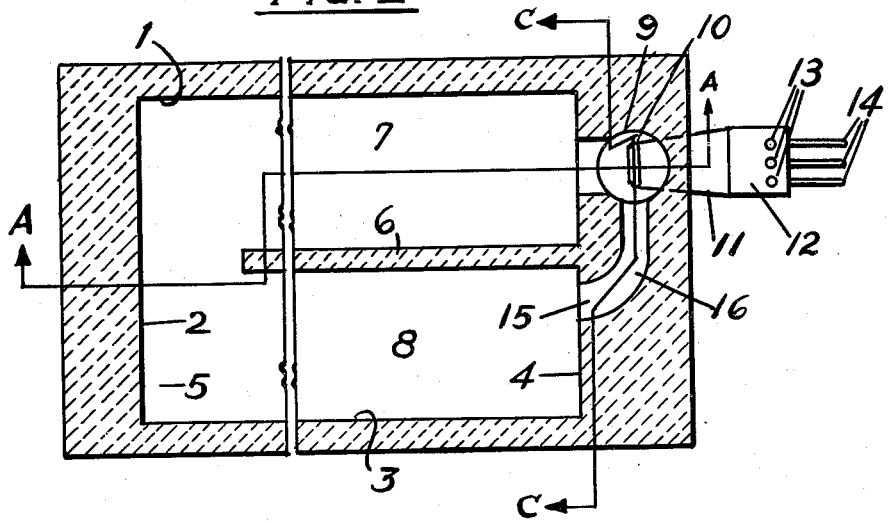

Before describing the drawing in detail, it may be observed that no attempt is made in the drawing to supply details of constructional features which are common in open hearth furnaces. Wherever possible the construction of the furnace is represented schematically, the purpose being merely to illustrate the features of the present invention. Aside from these features, the furnace may be assumed to be the conventional open hearth furnace.

Referring to Fig. 1, numerals 1, 2, 3, and 4 designate the four walls of the furnace defining the bed 5. Arranged substantially down the middle of the furnace is an upright wall 6 which extends from wall 4 more than half the length of the furnace to a point intermediate the center of the furnace and wall 2, rising from the bed of the furnace to its roof and dividing the bed into two sections 7 and 8. Wall 4 has on one side a vertical recess or sump 9. This sump is of any desired depth and has its open upper end terminating in the inner face of wall 4. At its lower end the sump is provided with a slot or opening 10 of appropriate configuration which forms the inner end of flue 11 which receives combustion gases from combustion chamber 12 provided with inlets 13 for combustible gas and inlets 14 for combustion supporting gas.

It will be understood that these gases can be mixed outside the combustion zone and introduced through a single inlet, the arrangement shown being intended for uniform distribution of combustion material in the combustion zone.

Because of the high temperatures generated by the combustion of the fuel gas, the employment of a combustion chamber outside the furnace, such as 12, may create some difficulty. This can readily be avoided by introducing the air and the combustion gas, each suitably preheated, separately into the sump and effecting the combustion in the sump itself. This is, in fact, the preferred procedure.

Wall 4 has an opening 15 in section 8 positioned so as to be in the slag layer of the furnace and forming the entrance to a downwardly inclined spillway 16 which empties into the sump.

Above the sump the end wall carries a cowl 17 which extends inwardly over the bed and has a rearwardly inclined skirt 18 which terminates just above the normal level of the slag layer and is spaced from the discharge end of the sump. The end wall also carries an overhanging ledge 19 which serves as a baffle to prevent molten slag from passing upwardly through the cowl and into the exhaust flue 20 which leads gases away from the cowl.

Closely adjacent the cowl, the roof 21 of the furnace is provided with an inlet pipe 22 for powdered metal. Through this pipe additional quantities of slagging constituents, when required, may be introduced together with the iron. Also alloying constituents such as carbon and other metals may be introduced at this point. This pipe near its discharge end is provided with a cooling jacket 23 which extends through the roof and is provided with an inlet 24 and an outlet 25 for cooling fluid, suitable baffles (not shown) being provided in the jacket to insure circulation of the cooling liquid. At the far end of the furnace from the sump and at the upper end thereof is another flue 26 which serves to draw off gases evolved during the smelting operation or which may be utilized to feed in inert or reducing gases so as to provide a protective blanket over the molten mass.

It will be understood that the furnace is equipped with suitably arranged heating means, which constitute no part of the present invention, for bringing the furnace to reaction temperature. The furnace is charged in the usual manner so as to establish a lower layer 27 of molten metal and an upper layer 28 of slag. Before the slag level reaches the opening 15 of the spillway 16 the admission of combustion gases into the sump is started so that as the slag builds up and spills into the sump that portion of it which enters the sump is lifted and simultaneously heated by the combustion gases so that it passes upwardly through the sump and discharges into section 7. When the furnace is in full operation there is a continual movement of slag from section 8 into the sump and back to section 7. At this time powdered impure metal is being fed in continuously through pipe 22 in which the powdered metal is, preferably, maintained in aerated or fluidized condition. It will be appreciated that the gas used for this aeration will not be an oxidizing gas. The powdered metal falling on the slag layer moves along with the slag and gradually settles through the slag layer into the molten metal layer. The furnace is provided with the usual taps for drawing off molten metal and slag so as to keep the respective layers at the desired level.

The gas fed to the sump may be fed in such quantities as to have a rising velocity therethrough adequate to give the desired lifting action which in most cases will be between about 10 and 100 ft./second. The type of gas lift which occurs in the sump will depend on the velocity of the gas passing through it. At lower velocities the gas lift will be the slugging type in which spaced slugs of melt are lifted by spaced bubbles of gas. As the velocity increases the slugging action tends to disappear and to be replaced by what may be termed a creeping action in which the melt clings to the wall of the sump as a film which creeps upwardly under the influence of the rising gas. At still higher velocities this film is, in effect, shredded off of the wall of the sump and dispersed in the gas as a spray in which condition it travels upwardly. The line of demarcation between these different types of gas lift is not sharp, one type overlapping into the other type so that at any given gas velocity two types of gas lift may be occurring simultaneously. It is preferred, in the practice of the present invention, when combustion is carried out in the sump, to control the velocity so as to achieve gas lift primarily on the creeping principle. This means that the velocity will be somewhere in the middle portion of the range given above.

For a better understanding of the present invention reference is made to the following operating data for a typical operation in a furnace of the type described in which one ton of iron is smelted per hour. The iron powder is introduced into the furnace at a temperature of 600° C. and the liquid iron is maintained in the furnace at a temperature of 1400° C. The slagging constituents of the feed are in such amount as to produce a half ton of molten slag which is also maintained at 1400° C. In this operation the air and fuel gas, in this case methane, are separately preheated, the air being preheated to 1000° C. and the methane to about 400° C. The flue gases leave the furnace at about 1600° C.

In this operation approximately 1,300,000 B. t. u.'s are required to heat and melt the iron slag. At the gas temperatures mentioned 1000 cu. ft. of methane produce about 580,000 B. t. u.'s. Thus, in the operation in question, about 2300 cu. ft. of methane are consumed. In the burning of this methane it is desired to raise the temperature of the slag passing through the sump about 100° F. Since the specific heat of the slag is about 0.3, 1 lb. of slag circulated will carry about 30 B. t. u.'s into the melting zone. Therefore, in this operation about 43,000 lbs. of slag are circulated in order to melt 1 ton of iron. This amount of slag corresponds to about 0.3 lb./cu. ft. of combustion gases taking into account the amount of air required to burn the methane to $CO_2$. Thus there is an ample gas flow to circulate the required quantity of slag and to raise its temperature the desired amount. If the operation is so conducted as to impart a smaller rise in temperature to the circulated slag, the circulation rate must be correspondingly greater. Conversely if the operation is conducted with a larger temperature rise of the circulated slag the circulation rate can be correspondingly less.

In the embodiment shown in Figs. 5, 6 and 7, heat is imparted to the circulated slag without employing the gas lift principle. In these figures, parts corresponding to those appearing in the preceding figures bear the same numerals. As with the previous furnace, the main portion of the furnace has a furnace bed 5 defined by walls 1, 2, 3 and 4 with a partition 6 extending from the center of wall 4 down the middle of the furnace bed to a point adjacent wall 2. In this case, however, the sump is omitted and instead a chamber 29 is provided behind wall 4, this chamber being substantially coextensive with the main body of the furnace.

That portion of wall 4 which is in section 8 is provided with a transverse slot or opening 30 arranged so as to be in about the mid portion of the slag layer whereby slag continuously runs from the slag layer into the chamber 29, therefore the liquid level in chamber 29 will normally tend to be the same as that in the furnace proper. That portion of wall 3 which forms a wall of chamber 29 is provided with a horizontal row of ports 31 so located as to normally be below the liquid level in chamber 29. These nozzles may be on the same level as, or above or below, the slot 30.

That portion of wall 4 which is in section 7 has its upper edge 32 cut away so as to be slightly below the normal liquid level in section 7 and chamber 29. Flow is set up from section 8 through chamber 29 to section 7 by the velocity of combustion gases entering chamber 29 through ports 31. These gases set up a wave action which causes liquid to flow from chamber 29 to section 7. As the gases progress across the chamber 29 they naturally tend to rise and leave the melt, passing upwardly through cowl 17 and out through exhaust pipe 20. The skirt 18 of the cowl is suitably arranged so as effectively to prevent the passage of combustion gases into the main body of the furnace. In the event that it is desired to insure complete mixing and combustion of the gases entering chamber 29, a hood may be arranged over the inner ends of the nozzles 31 in this chamber with the nozzles disposed above the normal liquid level in the chamber and the exhaust vent of the hood transversely arranged across the chamber below the normal liquid level therein so that the burned gases leaving the hood must pass through the melt.

It will be apparent that the methods illustrated are amenable to considerable change in detail without suffering any change in essential character. While the particular embodiments illustrated possess many unique features of construction and arrangement of parts, it is possible to design a suitable apparatus entirely different in appearance and general organization from that illustrated while still utilizing the principle of supplying heat to the smelting operation by circulating slag through a separate heating zone and returning it to the furnace bed. Such changes in design and arrangement are contemplated within the scope of the present invention.

The foregoing description has been directed to the purification of powdered iron. It will be appreciated that the principles underlying the method described are applicable to any case where a powdered metal which is highly reactive with oxidizing gases at elevated temperature is to be purified by smelting.

The nature and objects having been thus described and illustrated, what is claimed as new and useful and is desired to be secured by Letters Patent is:

1. The method of melting and purifying impure iron powder which comprises feeding said powder to a reservoir containing a layer of previously melted iron supporting a layer of molten slag in a zone substantially free of combustion gases and oxidizing gases, withdrawing molten slag from said reservoir, mixing said slag with a fuel and an oxygen-containing gas, the latter being in such quantity to effect good combustion of said fuel gas whereby combustion of said fuel occurs and the slag is heated to a temperature substantially above that prevailing in said reservoir, and returning said heated slag to the said reservoir, wherein it is caused to pass over an extended path covering substantially the entire area of said slag layer to supply substantially the entire heat required for the melting and purifying of the iron and recovering a melted and purified iron.

2. The method set forth in claim 1 in which the impure iron powder is fed to the said slag layer at a point adjacent the return point of the heated slag.

3. The method of melting and purifying impure iron powder which comprises feeding said powder to a reservoir containing a layer of molten iron supporting a layer of molten slag, continuously withdrawing molten slag from one point to said slag layer and returning it to said slag layer at a point removed from the withdrawal point to thereby set up a circulation of said slag layer, heating said withdrawn slag between its point of withdrawal and its point of return to said slag layer to a temperature above that prevailing in said reservoir by contacting the said slag with hot combustion gas, thereafter separating the gasiform material from said slag and returning the said slag to said reservoir, continuously feeding the impure iron powder to said thus heated slag layer and recovering from the process a melted and purified iron.

4. The method set forth in claim 3 in which the impure iron powder is fed to the said slag layer at a point adjacent the return point of the heated slag.

EDWIN R. GILLILAND.

REFERENCES CITED

The following references are of record in the file of this patent:

UNITED STATES PATENTS

| Number | Name | Date |
|---|---|---|
| 629,520 | Mond | July 25, 1899 |
| 1,320,483 | Lund | Nov. 4, 1919 |
| 1,535,109 | Davies | Apr. 28, 1925 |
| 1,865,183 | Gaus | June 28, 1932 |
| 1,905,185 | Morris | Apr. 25, 1933 |
| 1,926,563 | Seifer | Sept. 12, 1933 |
| 2,019,112 | Beekhuis | Oct. 29, 1935 |

FOREIGN PATENTS

| Number | Country | Date |
|---|---|---|
| 541,841 | France | July 24, 1922 |
| 278,985 | Great Britain | Oct. 17, 1927 |